H. H. CUMMINGS.
REVOLUTION COUNTER.
APPLICATION FILED JUNE 7, 1913.

1,217,920.

Patented Mar. 6, 1917.
3 SHEETS—SHEET 1.

Witnesses
Edward Maxwell
James R. Hodder.

Inventor:
Henry H. Cummings,
by Geo. W. Maxwell
Atty.

H. H. CUMMINGS.
REVOLUTION COUNTER.
APPLICATION FILED JUNE 7, 1913.

1,217,920.

Patented Mar. 6, 1917.
3 SHEETS—SHEET 2.

Witnesses:
Edward Maxwell
James R. Hodder

Inventor:
Henry H. Cummings,
by Geo. H. Maxwell, Atty.

H. H. CUMMINGS.
REVOLUTION COUNTER.
APPLICATION FILED JUNE 7, 1913.
1,217,920.
Patented Mar. 6, 1917.
3 SHEETS—SHEET 3.
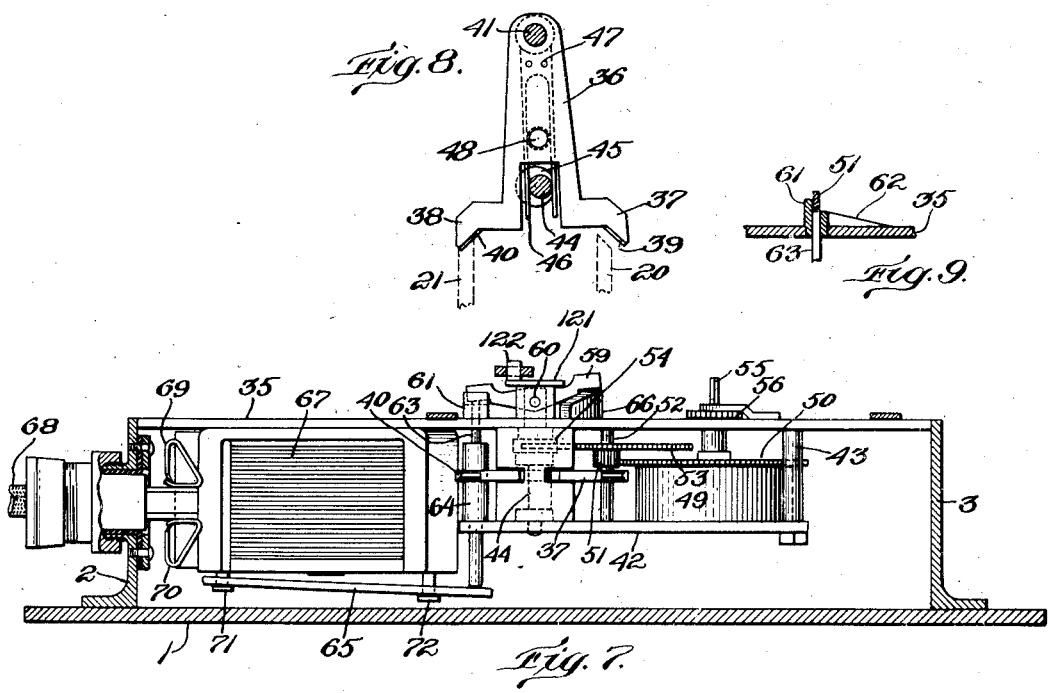
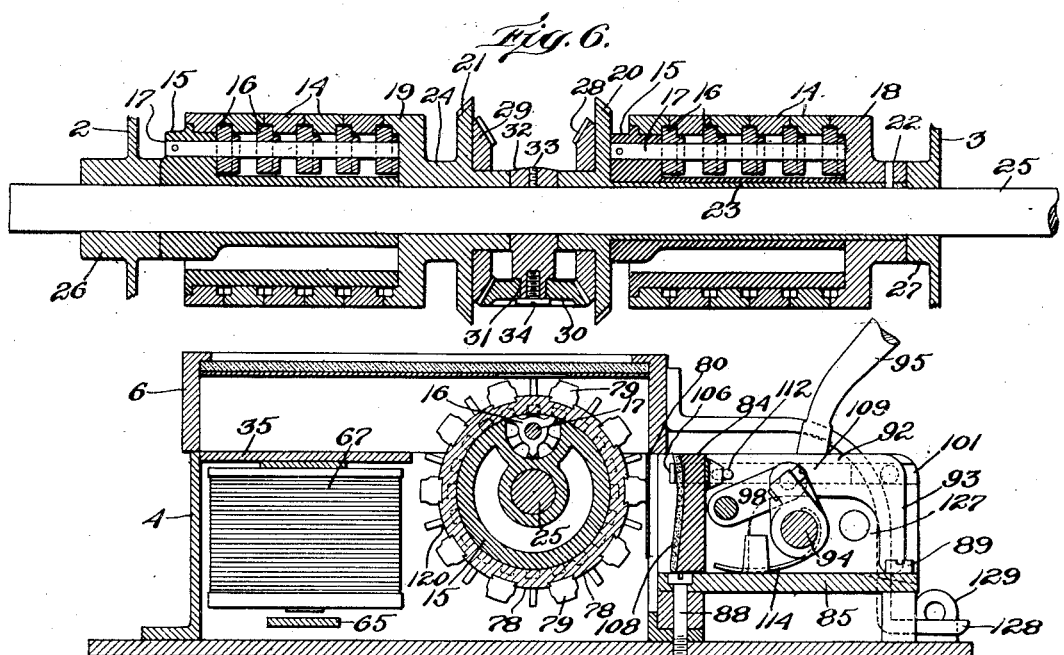
Witnesses:
Edward Maxwell
James R. Hodder
Inventor:
Henry H. Cummings,
by Geo. H. Maxwell atty.

UNITED STATES PATENT OFFICE.

HENRY H. CUMMINGS, OF BOSTON, MASSACHUSETTS.

REVOLUTION-COUNTER.

1,217,920.  Specification of Letters Patent.  Patented Mar. 6, 1917.

Application filed June 7, 1913. Serial No. 772,359.

*To all whom it may concern:*

Be it known that I, HENRY H. CUMMINGS, a citizen of the United States, and resident of Boston, county of Suffolk, State of Massachusetts, have invented an Improvement in Revolution-Counters, of which the following description, in connection with the accompanying drawings, is a specification, like letters on the drawings representing like parts.

My invention is a revolution counter for use in counting and indicating, as well as in providing means to record permanently, the number of revolutions of an engine shaft or of a plurality of such shafts.

The present invention is particularly intended for use in testing and securing data of the several engines on the ship during the standardization trials of the ship. As is well known, such standardization trials comprise a large number of experimental trips over carefully measured distances with the ship's engines running at varying rates of speed. By means of these series of trials, the revolutions per minute of the ship's engines at such varying speeds are found, and consequently the speed of the ship under varying conditions also is determined by taking the number of revolutions of the engines. In these standardization trials it is of course of the greatest importance to provide means which shall indicate and register the exact number of revolutions of the ship's engines, and great care and skill have heretofore been required to secure this data with exactness and without error and with the ship running at high speed. Usually the vessel is run back and forth over a measured mile or miles, and the officers in charge endeavor to note as the ship rushes past the buoy marking the mile or the ranges marking either end of the measured mile, the number of revolutions of the ship's engines on a revolution counter of ordinary type. The difficulties of exactness, however, in such a procedure will be appreciated, and in order to assist the officers in charge it has heretofore been attempted to secure a record indication of the engine counting mechanism during its continuous operation by printing from the continuously rotating indicator on a card at the beginning and end of the distance run, the figures shown at these times by the indicator. This has been unsatisfactory, as well as inaccurate owing to the difficulties of determining the instant that the ship passes the given range or buoy, as well as the difficulty in securing a print from a rapidly rotating indicator.

My invention is intended to obviate the difficulties above noted, and to provide means which will enable the navigating officer of a ship to so actuate my improved counter and indicator that, as the ship passes the given range or buoy at any speed, entering the measured mile, the indicating mechanism will be so set that one indicator will be thrown out of mesh with its actuating means and the indicator thereon may be read or printed at leisure and with absolute accuracy, while a companion indicating mechanism is being actuated to show the continued rotation of the engines. Then as the next range comes into view, the mechanism may be actuated to disconnect the indicator which has been running, and to automatically and instantly connect the idle indicator, actuating the latter to show continued rotation of the engine or propelling shafts without chance of error or losing a single rotation or fraction thereof while leaving the indicator which has been in operation during the time the ship was traversing the measured mile at a standstill in order that its indications may be accurately read and printed, if desired. Preferably I provide means whereby the actuations of the indicating mechanism as just explained may be made by the same navigating officer who is sighting for the ranges at either end of the measured mile, by means of an electric switch which may be held in the hand at a distance from the indicating mechanism and operated each time the ship passes a given range.

An important feature of my invention is that means are provided whereby the sum of the readings of the two indicators will always show the total number of revolutions of the ship's engines. If both indicators are in action they will each register only one-half the number of revolutions of the shaft being counted; but when one indicator is thrown out of operation and left at a standstill as above briefly explained, the other indicator will be instantly actuated at twice the former speed imparted to it, and thus indicate exactly the full number of revolutions per minute of the engine shaft whose rotations are being counted by the mechanism. A still further feature of particular importance in the present invention is that as the switch mechanism is operated, throwing one indicator out of actuation while connecting the other indicator at full speed of the counting shaft to continue the registering of the counting mechanism, the mechanism is automatically set to respond to the next operation of the switch, whereby the other indicator is thrown out of actuation, and that previously left at a standstill is thrown into actuation, without the loss of a single rotative movement of the actuating shaft or even a fraction of said movement.

Other features of the invention are that a printing mechanism is provided, in convenient position to print from the indicator at a standstill the exact registration indicated when said indicator was disconnected from the actuating mechanism, and that such indicating mechanism is rendered inoperative automatically as soon as the counter is again connected with the moving part of the device and commences its rotation and counting movement. Thus the printing mechanism can only be utilized to take an imprint from the indicator which is at a standstill and cannot be brought into engagement with the indicator which is in action.

Other features of the invention, novel combinations of parts, and details of construction, will be hereinafter more distinctly pointed out and claimed.

Referring to the drawings wherein a preferred embodiment of the invention is illustrated, Figure 1 is a plan view of the covered box containing the indicators and of the electric switch, the latter being shown partly in section;

Fig. 5 is a cross sectional view on the line 5—5 of Fig. 3;

Fig. 6 is a cross sectional view on the line 6—6 of Fig. 3;

Fig. 7 is a cross sectional view on the line 7—7 of Fig. 3;

Fig. 8 is a detail view, partly in section, of a portion of the latch mechanism for locking one indicator and holding it at a standstill while releasing the other; and Fig. 9 is an enlarged detail view of a stop and tripping mechanism.

Figure 1:
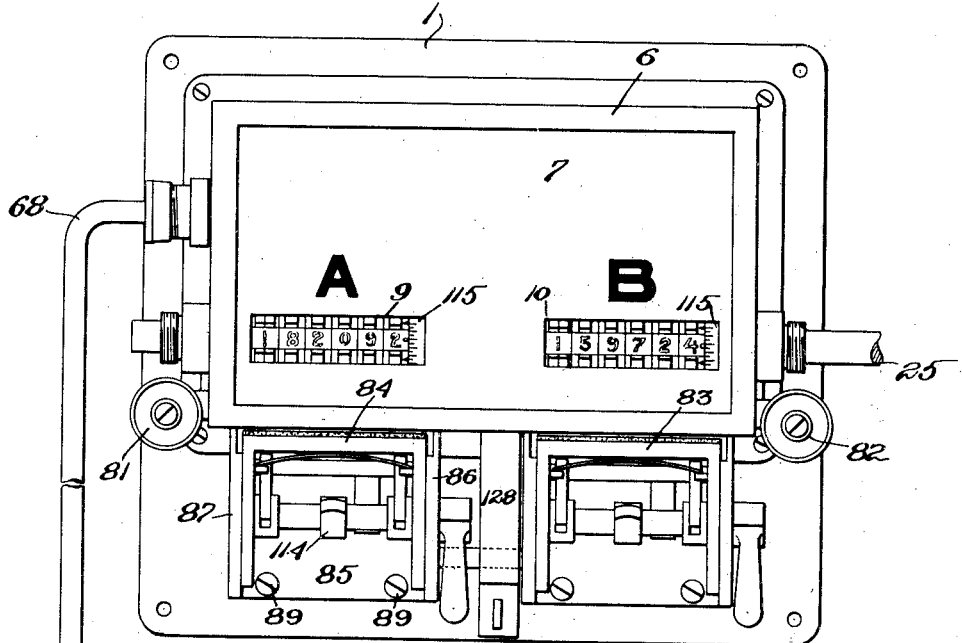

In carrying out my invention I preferably employ two duplicate indicating mechanisms, each being of well known type, in the arrangement thereof for counting the revolutions of a shaft, but each being of novel form on the exterior thereof, carrying duplicate but correlated sets of indicating figures, one set to be read visually by the navigator, and the other set to impart a printed record of the same figures as that shown, together with means to indicate both visually and in printing, a fractional part of a revolution. These two counters or indicators will be referred to as A and B as shown in Fig. 1, and are mounted in a suitable closed receptacle therefor, comprising a base 1, sides 2, 3, 4 and 5, and a hinged top or cover 6 having a glass plate 7 held in place by a metal plate 8 having openings 9 and 10 therein to permit reading of the indicators A and B as shown in Fig. 1. The plate 8 and glass 7 are secured in place in any suitable or desired manner against the inturned flange 11 of the cover 6, which cover is hinged to the side 4 as shown at 12 and 13. The indicators A and B comprise a suitable number of index rings 14 mounted to turn freely on the supporting drum 15 and being successively actuated by internal star wheels 16 mounted on spur shafts 17 secured at one end to the supporting drum 15 as clearly shown in Fig. 6, which constitutes a well known type of rotation counter construction. The first or index rings 18 and 19 of each indicator A and B are arranged to be actuated by the rotation of gear wheels 20 and 21 respectively; the ring 18 being keyed at 22 to the hub or sleeve 23 which carries the gear wheel 20 and the index ring 19, being pivotally formed integrally with the hub 24 carrying the gear wheel 21. Both indicators are supported on a shaft 25 fitted in suitable journal bearings 26 and 27 in the sides 2 and 3 of the receptacle. The gears 20 and 21 have their hubs extending toward each other sufficiently to enable toothed wheels 28 and 29 respectively to be fitted upon each hub and be keyed thereto, the teeth of these wheels being beveled to mesh with a spur gear 30, loosely mounted on a stud 31 secured to a collar 32, which collar is keyed to the shaft 25 at 33 and is of appropriate width to provide a running fit between the extended hubs of the gears 20 and 21, as illustrated in Fig. 6. A threaded cap 34 holds the spur gear 30 in place on the stud 31. Preferably the length of the indicators A and B comprising the drums 15, gears 20 and 21 with their hubs 23 and 24, and the collar 32 are of appropriate length to snugly fit within the inner limits of the journal bearings contained in the sides 2 and 3, so that the entire mechanism, when assembled, is held in proper relationship. Rotation of the shaft 25 acts to rotate the collar 32 and the gears 20 and 21 through engagement of the spur gear 30 with the teeth 28 and 29, secured respectively to the hub of the gear wheels 20 and 21. Actuation of the latter rotates the index rings 18 and 19 of each indicator and consequently the chain of index rings through the various spur gears as will be readily understood. The shaft 25 is intended to be connected with the propelling engine or engines of a ship through any suitable source of power transmission, and may be connected first to one engine, and then to another, or to a plurality of ship's engines, such as the starboard and port engines usually employed in twin screw vessels. The various tests during the standardization trials of the ship may be thus taken in connection with any engine or with the entire set of engines, as may be desired. Assuming that it is desired to first make tests and experiments with the starboard engine, for example, the shaft 25 is connected with a moving part of such engine, usually the crank shaft or propeller shaft actuated thereby, by any suitable means, but at one-half the actual speed of rotation of said propeller shaft. This feature is of importance, as I desire in the present invention, to provide that the sum of the indications of both indicators A and B shall equal the total number of engine revolutions which are to be counted and registered. Therefore the shaft 25 is initially turned through one revolution for each two revolutions of the engine shaft. With both indicators free to register and the shaft 25 in rotation, the spur gear 30 will rotate the wheels 20 and 21 at equal speed and in the same direction actuating each indicator equally and consequently showing in each indicator one half the number of revolutions which the ship's engines are making, the sum of both indications showing the total number. The spur gear 30 and the gears 28 and 29 secured respectively to the wheels 20 and 21 actuating the index rings 18 and 19 are of equal diameter so that if the gear wheel 21, for example, is locked or stopped from rotation, and the rotation of the shaft 25 is continuing, the spur wheel 30 will at once rotate the gear wheel 28 and consequently the wheel 20, hub 23, and index ring 18 of B indicator at exactly double the speed it was formerly being turned. This results from the gear 29 being held stationary and the spur wheel 30 turning upon its axle 31, as will be readily understood. Consequently B indicator will then count and show the exact number of revolutions which the engine being tested is making, and the sum of the indications of both indicators will still continue at all times to show exactly the number of revolutions made. If the gear wheel 20 is locked and the wheel 21 left free to turn, then A indicator will be similarly actuated and will, of course, register the full number of revolutions which the engine being tested is turning. While one indicator is at rest and the other turning, the indicator at rest shows the number of turns which it has reached, and this number will be read by the navigator in charge carefully and at leisure, and I provide means also by which a print of the number so indicated may be taken from the indicator at rest, and thus a permanent and accurate record made thereof.

My invention contemplates means to automatically, instantly and without the chance of loss or error to lock either wheel 20 or 21, while permitting the other to be freely actuated by the shaft 25 during the continuous rotation of the shaft 25, and at any speed. Also to provide means to secure printed records from either indicator A or B, while one indicator is at rest, to prevent automatically the contact of the printing mechanism with the indicator in rotation. I also provide a novel arrangement of indicating rings, whereby the print secured at any time from the indicator at rest, will show exactly the numbers which said indicator registers, and which is visible to the navigator through the openings 9 and 10, and yet will not obscure the visual readings of said numbers, and in fact may be secured at a different part of the indicator, i. e. on the side and at the front of the indicator from which a print is being secured. Thus the visual readings of the indicator and the printed record therefrom may be taken simultaneously, and each will show exactly the number of turns registered by that indicator.

In order to control the locking and freeing alternately of the indicators A and B, I provide mechanism at the back of the receptacle supported by a plate 35, which will actuate a latch or lock 36, having arms 37 and 38, each provided with a single tooth 39 and 40 respectively, which teeth are adapted to register between teeth in the gear wheels 20 and 21, (see Fig. 8). This latch 36 is pivotally mounted on a short stud 41, acting between the plate 35 and a lower supporting plate 42 which is supported from the plate 35 by a plurality of standards 43, one being indicated in Fig. 7. The latch 36 is preferably arranged to be swung into alternate engagement with the gears 20 and 21 through an eccentric shank 44 on the shaft 45, which shaft is pivotally mounted between the plates 35 and 42. In order to provide a slight yield to prevent binding when the latch 36 is thrown from engagement of one gear wheel 20 or 21 to the other, a U-shaped spring 46 is arranged, secured to the latch 36 by a plurality of rivets or the like, as indicated at 47 and passing around a short depending boss 48, which spring tightly fits about the eccentric pin 44 of the shaft 45, and thus permits a slight yield between the action of the eccentric 44 and latch 36. This feature is of particular importance, as if the latch 36 is swung so that a tooth 39, for example, rides upon a tooth of the gear wheel 20, no damage results, as the instant that the tooth in the wheel 20 moves past, freeing the tooth 39, the latter will be snapped into position behind such tooth on the wheel 20 by the action of the spring 46, the eccentric 44 meanwhile having been rotated its full distance to throw the latch and release the wheel 21 and lock the wheel 20.

I preferably arrange the shaft 45 to be rotated in one direction by a coiled spring 49 acting through a gear wheel 50 on a pinion 51 carried by the shaft 52 supported between the plates 35 and 42 and carrying a geared wheel 53, which acts on a correspondingly toothed part 54 of the shaft 45. A key stem 55, ratchet 56, latch 57, and latch spring 58 are provided to wind up the spring. Thus the spring 47, when wound up, is exerting a constant tension through the train of gears just explained, to rotate the shaft 45 and the eccentric shank 44, which shank throws the latch 36 into and out of locking engagement with the gear wheels 20 and 21 successively. In order to control this actuation of the latch 36, however, I provide an escapement under the constant control of the navigator, as will now be explained. The upper portion of the shaft 45 is slotted to receive a cross bar 59, which is pivoted therein at 60, said cross bar being freely movable on its pivot. The windings of the spring 49 and the gears therefrom to the shaft 45 rotate the shaft 45 and cross bar 59 in a contra-clockwise direction, a stop 61 being provided against which an end or wing of the cross bar 59 bears. This stop 61 is secured to the plate 35 and is formed as shown in Fig. 9. A cam piece 62 is provided in front of the stop 61 so that the end of the cross bar 59 will ride up properly to its seat in the stop 61, as shown in said Fig. 9. I arrange the stop 61 hollow to receive a stem 63, which stem extends through suitably bored apertures in the plates 35 and 42, having its intermediate portion 64 of greater diameter than the bored apertures and of suitable length to provide shoulders to limit the sliding movement of the pin 63 through said apertures. The lower portion of said pin extends into engagement with a lever 65 (see Fig. 7). When the cross bar 59 is seated in the stop 61 as shown in Fig. 9, and still under the constant tension of the spring 49 to force it in a rotative direction and the lever 65 is lifted, the pin 63 slides upwardly through the stop 61, striking the end of the cross bar 59 and raising it above the portion of the stop 61 which holds back said cross bar, permitting it to swing around in response to the action of the spring 49 through one-half a revolution until the other end of the cross bar rides up on the cam 62 and strikes against the stop 61. This semi-rotation of the shaft 45 acts through the eccentric shank 44 to swing the latch 36 from engagement with one of the gear wheels 20 or 21 to the other, as has been explained. To still further control the action of the cross bar 59, I provide a cam 66 for the other end of the cross bar so that its action will be positively controlled. This cam 66 has an inclined face on which the end of the crossbar 59, rests, and which insures the opposite end of the crossbar being engaged by the stop 61 and preventing it from jumping over said stop, but holding same accurately in position,—as clearly shown in Fig. 7.

In order to control the movements of the lever 65 and consequently the action of the latch 36, I provide a magnet 67 adjacent the lever 65 and arranged to receive electrical energy through a source of supply 68, spring contacts 69 and 70 therefor being shown. Brackets 71 and 72 to support the lever 65 when in lowered position are also arranged. When current is supplied to the magnet 67 through the wires carried by the cord 68, the coil 67 is magnetized, the lever 65 lifted and thereby raising the pin 63 and releasing the cross bar 59 from its engagement with the stop 61, the spring 41 then acting to swing the shaft 45 through one-half a revolution until the other end of the lever 59 is caught by the stop 61, as just explained. In order to control the supply of current to the magnet 67, I arrange the wires through the cord 68 from the primary socket or supply 73 to a switch handle 74 and 75 having contact points 76, 77 normally separated, and therefore the current supply normally interrupted and the coil 67 de-magnetized. The navigating officer holding the handles 74 and 75 in his hand, may be a slight squeezing together of the handles, bring the contact points 76 and 77 together, thus establishing electrical connection from the primary source of supply 73 to the magnet 67 and completing the circuit therethrough, actuating the lever 65, pin 63, cross bar 59 and the latch 36, and thereby stopping one indicator, while throwing the other into action during the continuous rotation of the shaft 25.

The actuation of the latch mechanism by the magnet 67 and spring 49 serves to alternately connect one register with the rotating mechanism and then the other, but when it is desired to have this latch mechanism at neutral and both registers rotating in unison, the shaft 45 may be turned by hand until the eccentric shank 44 frees the arms 37 and 38 and holds them both clear of engagement with the respective wheels 20 and 21. To accomplish this movement, it is only necessary to release the pawl 57 and relieve the spring 49 so that the latter will be inoperative. In actual use, the alternating mechanism above described, whereby the spring and magnet are employed, will only be thrown into operation when the standard trials of the ship, or of a new propeller, are being carried on. At such times the spring 49 may be wound up, and a current supply to the magnet and switch handles 74 and 75 be connected for operation.

Thus with my rotation counter in connection with an engine of a ship, the navigating officer holding the switch handles 74 and 75, and sighting on the range marking the entrance of the ship upon a measured mile, can instantly set one indicator into counting action as the ship rushes past the range at any speed by an instantaneous squeezing of the handles 74 and 75, said indicator being continuously actuated until a second range is passed, when by another instantaneous squeezing of the handles, the indicator which has been running will be automatically stopped and locked, and the other indicator set in counting motion. The reading of the indicator now at rest may be taken accurately, as well as a print therefrom secured, so that no chance for error exists. Meanwhile the second indicator is in motion, and when a third range is passed, this indicator may be stopped and the first indicator again set in action, while a reading and print is secured from the second indicator. During this stopping and starting of alternate indicators, not a single rotation of the shaft 25 or of the engine actuating it, is lost, because the sum of the two indicators will always show the total number of revolutions of the shaft, irrespective of how many readings may be alternately taken from the two indicators, while said indicators are temporarily at rest. The importance of thus providing means for accurately securing readings, as well as printed records of the revolutions of a ship's engine during her standardization trials, will be readily appreciated, and furthermore the fact that my indicator still continues to show the total revolutions is of great assistance in saving additional trips over the measured miles, as well as in securing accuracy of results. Furthermore the provision of means whereby the same navigating officer can sight along ranges marking stations over the trial course, while setting the indicators to run, almost in the nature of setting a stop watch, permits greater accuracy than has heretofore been possible where the officer had to sight ranges and also try to secure as good a reading from a constantly rotating indicator as he could, or where one officer made the sight and another tried to read the registration shown by a moving rotation counter.

Figure 2:
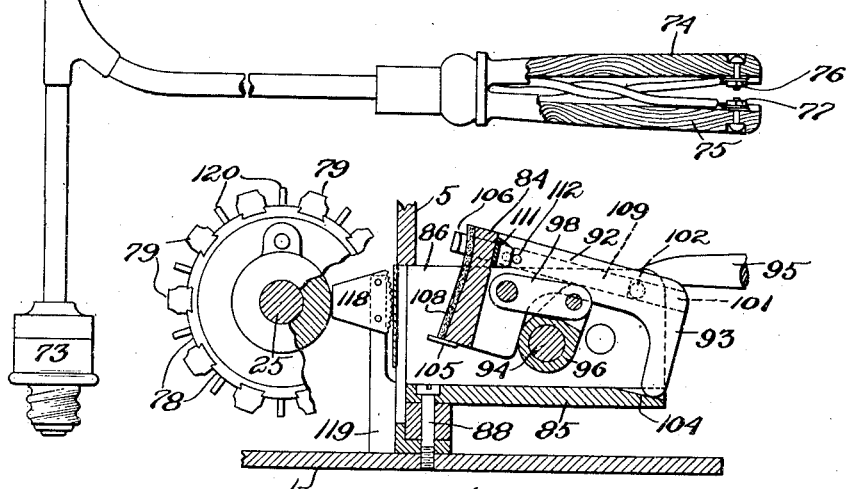
Fig. 2 is an enlarged view, partly in section, of the means to obtain a print from the indicator.

In order to secure a printed record from each indicator, I provide indicating rings of novel form having means to indicate fractional portions, as well as to print a duplicate of the reading shown through apertures 9 and 10 of each indicator, at a different point on the circumference of the indicator. Each indicating ring has the usual plurality of successive figures successively around its periphery and in position to be read visually by the observer through the apertures 9 and 10 of the cover of the receptacle and in addition thereto, has a corresponding plurality of type containing corresponding figures, but arranged in a different radial position. The figures intended for visual sighting are carried about the index rings in the portions 78 (see Fig. 5) and between are affixed raised type 79. The figures at 78 being in proper position right side up and being painted or otherwise rendered more prominently visible than the type which is upside down, readily catch the eye without confusion with the type figures. The type 79 is so arranged in a sequence that the figure carried by the type in the front position of the indicator corresponds to the figure which is in position on the top of the indicator in line for visual reading through the apertures 9 and 10 and substantially 90° apart. Thus the printed record secured from the type which may be in line throughout the length of an indicator at the front portion will correspond to the figures showing through the apertures 9 and 10 for visual reading at the top of the indicator. In order to conveniently secure a printed record from these type, I provide an inked ribbon 80, which may be wound on spools 81 and 82 at either end, in a manner similar to that employed on a typewriting machine, and arrange a sliding carrier in position to carry a card or the like, and secure a print from the row of type at the front of each indicator, when the indicator is at rest by impressing the card against the ribbon 80 and type in position as explained. These slides are conveniently mounted in the front of the machine, one slide 83 being arranged to secure a print from B indicator, and the other slide 84 to coöperate with A indicator, said slides being exact duplicates of each other; the latter will now be described. Each slide is arranged to be reciprocated and supported in a guideway comprising a lower plate 85 (see Fig. 2), and vertical sides 86 and 87, which guideways are secured to the base 1 by any suitable means, such as threaded bolts 88 adjacent the front partition 5 of the box containing the mechanism and bolts 89 passing through supporting standards 90 carried by the base 1 at the front of the slideways. The slide 84 comprises a substantially U-shaped member with side wings 91 and 92 constructed and arranged for sliding movement within the side walls 86 and 87 of the guideway, said wings 91 and 92 being recessed underneath and having depending portions, as indicated at 93 resting upon the plate 85 (see Fig. 2). A bolt 94 which carries a handle 95 is arranged to pass through suitable apertures therefor in the sides 86 and 87 and under the wings 91 and 92, the recesses in said wings being of sufficient extent to permit the same. Keyed to the shaft 94 are a pair of cranks 96 and 97, having pivoted thereto links 98 and 99 respectively, which links are in turn pivoted to the front portions of the sides 92 and 91 of the slide 84. By this construction actuation of the handle 95 and partial rotation of the shaft 94 acts to reciprocate the slide 84 to and fro in the vertical guide ways 86 and 87 and over the plate 85 as will be readily understood on reference to Figs. 2 and 5. Preferably the side wings 91 and 92 have grooves 100 and 101 formed in their upper portions, which coöperate with short studs 102 and 103 on the guideways 86 and 87 respectively, so that as the handle 95 is moved to actuate the slide or carrier 84 rearwardly, the forepart of the carrier will be lifted or raised to facilitate the insertion of a card or pasteboard at the front or printing end. The lower portion of the plate 85 is beveled as indicated at 104 to facilitate this tilting action, permitting the rearwardly depending portions of the sides 91 and 92 to be depressed therein. In order to conveniently hold a card at the forward part of the carrier 84, a stop 105 is provided at the foot thereof and side guards 106 and 107 to hold the card when placed in position are also shown, a pad 108 being provided as a yielding backing for the card when the slide is pressed forward against the ribbon 80 and the impression from the type 79 is received on the card. These side guides 106 and 107 have shanks 109 and 110 respectively, which fit in the grooves 100, 101, said shanks being each of sufficient length, so that as the carrier 84 is reciprocated rearwardly and tilted upwardly, said shanks strike against the studs 102, 103, forcing said guards upwardly to facilitate positioning the card to be printed. As the slide 84 is lowered and moved into printing position, these guards 106, 107 are slid rearwardly by the action of a spring 111 secured to the front of the carrier 84 by screws or the like, and having each end bear against short studs 112, 113 carried by the shanks 109 and 110 respectively. The studs 112, 113 pass through suitable slots provided therefor in the sides 92 and 91, the slot in the side 92 being shown in dotted lines in Figs. 2 and 5. In order to throw normally the slide backwardly away from printing engagement, a spring 114 is affixed to the shaft 84 and slides upon the part 85 of the guideway. The handle 95 is utilized to move the slide forwardly and rearwardly, but as soon as the handle 95 is released from the forward movement during the printing action, the spring 114 will tend to contract slightly the carrier 84 from immediate engagement with the ribbon 80 and type of the indicator. It will be understood that the front 5 of the receptacle is slotted opposite each carrier 83, 84 so as to permit the card held against the pad at the face of the carrier to be forced through the slot and into printing engagement with the type on the indicator.

In order to show fractions both visually and in printing, I provide scales 115, 116 having fractional designations thereon which coöperate with grooves 117 to register the fractions of a revolution of a shaft. In order to similarly register the fractions on the printed card, a scale 118 is secured to a standard 119 affixed to the base 1 in position to coöperate with pins 120 and receive impressions therefrom on the card held by the printing carriers, the scale 118 having provision to indent the card through the ribbon 80 and show corresponding fractions in coöperation with the indentations made by the pins 120 with the scales 115 and grooves 117 for the visual indicator. The fixed scales 115 and 116 aid in showing the fractions between the adjacent figures, to the eye of the observer, and the corresponding fractions carried by the scale 118 which indents the printing card. The pins 120 between the numerals showing an impression opposite the fraction on said scale to which the counter may be turned at the moment of taking the printed impression.

Figures 3, 4:
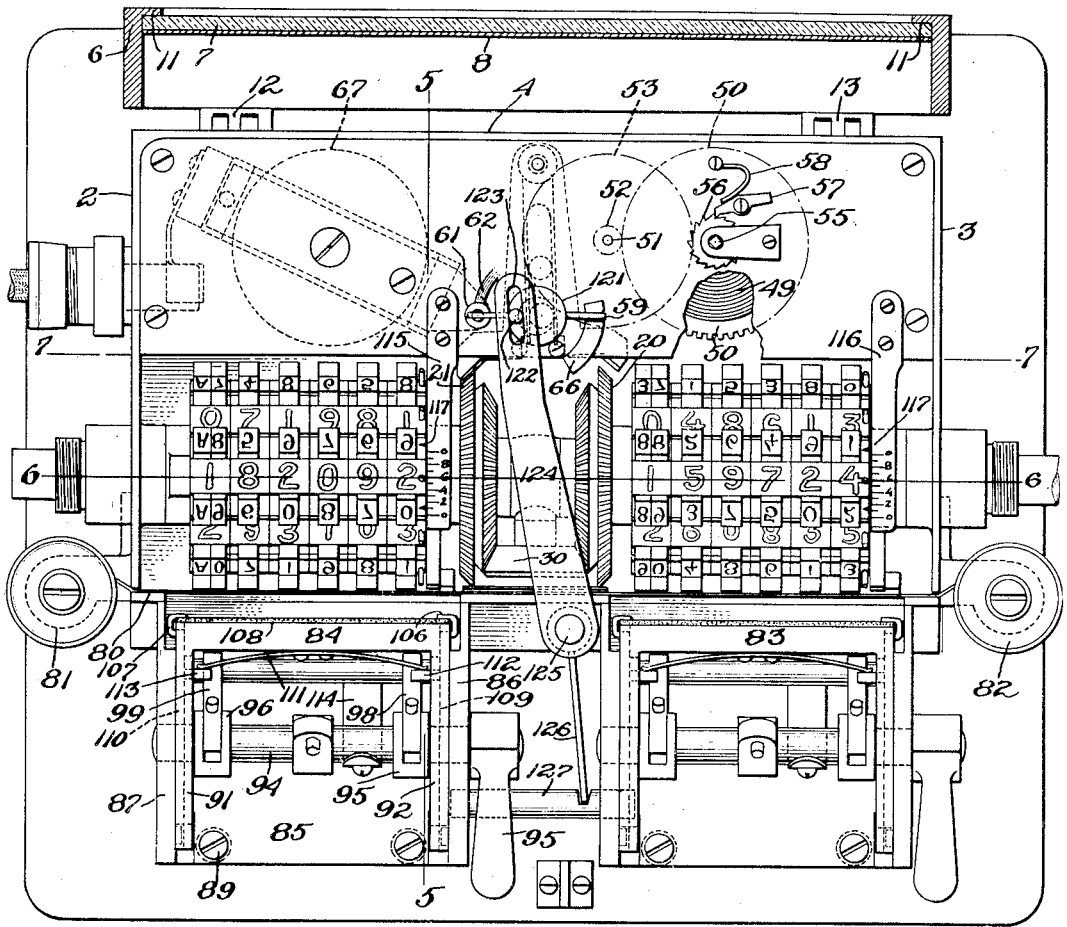
Fig. 3 is an enlarged plan view of the indicating mechanism with the cover removed, a portion being shown in section.
Fig. 4 is a side view of the front of the apparatus.

In order to lock each printing carrier 83 and 84 alternately so that the carrier opposite the indicator which is in motion cannot be actuated and hence no mistake in securing the printed record can occur, I preferably provide automatic means to alternately lock these indicators, which means is actuated by the switch in the handles 74 and 75 at the same time as the latch 36. To this end I affix on the shaft 45 a plate 121, carrying a pin 122, which pin works in a slot 123 in the end of a lever 124, said lever being pivoted at 125 at the front of the receptacle containing the indicating mechanism and having a short arm 126 extending therefrom. The arm 126 reciprocates a shaft 127 (see Fig. 3) which shaft slides through apertures provided therefor in the guideways of the slides 83 and 84 respectively, said apertures being in position to catch the rearwardly depending portions of the side 92 of the carrier 84 and of the corresponding side of the carrier 83 alternately, but not simultaneously. Thus when the shaft 45 is rotated and the latch 36 is thrown into engagement with the gear wheel 21 stopping A indicator, the pin 122 swings the lever 124 on its pivot 125 and through the extension 126 throws the shaft or bolt 127 to the right, viewing Fig. 3, causing the end of said bolt to project within the path of movement of the depending portion of the side of the carrier 83, preventing the same from being moved into engagement with the type on the indicator B, which indicator is now in rotation. Such sliding of the bolt 127 to lock the carrier 83 however, serves to withdraw the bolt 127 from its previous locking engagement on the depending portion 93 of the side 92 of the carrier 84, thus permitting said carrier to be reciprocated against the type on A indicator, which indicator is now at rest and to receive a print therefrom.

It will thus be seen that I have provided a revolution counter which is of special and peculiar value in the standardization tests of engines, particularly ships' engines, and which enables the navigator to instantly set in motion an indicator at the beginning of the ship's entering on the measured course, which setting is done with great accuracy as the observer cites the range marking the entrance of said course and which permits said indicator to run continuously until another range is passed, when it is stopped and a corresponding indicator automatically set in motion. Also that I have provided a revolution counter which permits permanent records to be printed therefrom as well as read thereon while the indicator is at rest, and hence such readings are made with accuracy and yet which constantly indicates the total number of revolutions irrespective of such temporary stopping and printing and reading of either indicator. Furthermore, in my revolution counter the indicators are controlled by the navigating officer who also may visually take the sights or ranges of the course over which the ship is running, and there is therefore a minimum chance for error in accurately starting or stopping an indicator as a range is passed, even when a ship is running at great speed. Besides my mechanism automatically prevents any printing record to be taken, excepting the correct one from the indicator which is at rest. In order to prevent tampering with the indicator, I prefer to provide a cover with a hasp 128 fitting over an eye bolt 129 affixed to the base 1 and in which a padlock may be secured. The printing device being exteriorly from the receptacle containing the indicating mechanism, may, of course be operated without disturbing the lock and the reading through the apertures 9 and 10 can, of course, be readily taken with the cover 7 closed. The indicator itself may be moved from place to place, and the switch and control 68 may be removed for convenience in handling or a longer cord attached, as may be desired.

While I have described my invention as intended primarily for use in connection with the trial trips of a ship, and counting and registering the revolutions of the ship's engine, over a measured mile, it will of course be understood that my invention is equally useful in so testing any engines with a stopwatch or timepiece. The indicators of my mechanism can be alternately set to run as above explained, during different intervals of time, to ascertain the number of revolutions per minute or fraction thereof. Also to determine the number of revolutions for successive intervals of time and simultaneously registering the total number of revolutions for the entire series of time.

Having described my invention, what I claim as new and desire to secure by Letters Patent is:

1. In an apparatus of the class described, an indicator comprising two revolution counters to register the total number of revolutions of an engine shaft when operated together or separately, in combination with means to connect said counters to an engine shaft.

2. In an apparatus of the class described, an indicator comprising two revolution counters to register the total number of revolutions of an engine shaft when operated alternately or together, in combination with means to connect one of said counters with the engine shaft at a predetermined rate of speed, or both of said counters with the engine shaft at a lower rate of speed proportioned for registration by both counters for the same total indications as the same counter acting independently.

3. In an apparatus of the class described, an indicator comprising a plurality of revolution counters adapted to register the total number of revolutions of a shaft, either when operating jointly, or separately, or alternately in combination with means to connect all said counters at one rate of speed with the shaft, while permitting disconnection of one counter and simultaneously connecting the other counter or counters with said shaft at different rates of speed, proportioned to register constantly the total number of revolutions of the shaft at all times, irrespective of how many counters are operating.

4. In an apparatus of the class described, an indicator comprising two revolution counters capable of being operated together to jointly show the total number of revolutions of an engine shaft, each of said counters being capable of registering the revolutions of an engine shaft while the other counter is disconnected and at rest, means to operate both or either of said counters at will, said means actuating both counters at half the rate of speed of the rotating shaft connected therewith, and actuating either counter at the full rate of speed of said shaft.

5. In an apparatus of the class described, a revolution counter comprising two indicators operable together or separately to register the total number of revolutions of a shaft, printing devices coöperating with each counter to register an impression therefrom, in combination with means to automatically lock the printing device of one counter while said counter is in rotation, and to automatically unlock said device when its corresponding counter is at rest, thereby permitting the printing device to be actuated and a record to be obtained.

6. In an apparatus of the class described, a revolution counter comprising two indicators capable of operating together at one speed or separately at a different speed to register continuously the total number of revolutions, in combination with means under the control of the operator, to cause either indicator to be responsive to the rotation of a revolving shaft during the continuous rotation of said shaft.

7. In an apparatus of the class described, a revolution counter comprising two indicators, in combination with means under the control of the operator, to cause either indictator to be responsive to the rotation of a revolving shaft during the continuous rotation of said shaft, and having means to start one indicator in operative engagement with the shaft and simultaneously to lock the other indicator out of engagement with said shaft during the continuous rotation of the shaft, in combination with printing devices coöperating with each indicator, the printing devices for one indicator being locked against operation while its counter is registering, and means acting upon the stopping of said indicator to simultaneously release the locking of the adjacent printing device.

8. In an apparatus of the class described, a revolution counter comprising two indicators, in combination with means under the control of the operator, to cause either indicator to be responsive to the rotation of a revolving shaft during the continuous rotation of said shaft, and printing means coöperative with each of said indicators to record the indications of either indicator while at rest during the continuous actuation of the other indicator, and automatic means to prevent contact of the printing mechanism with the indicator in rotation.

9. In an apparatus of the class described, a revolution counter comprising two indicators, in combination with means under the control of the operator, to cause either indicator to be responsive to the rotation of a revolving shaft during the continuous rotation of said shaft, said means comprising a switch control exteriorly of the indicating apparatus, constructed and arranged to be operated a remote distance from the indicator.

In testimony whereof, I have signed my name to this specification, in the presence of two subscribing witnesses.

HENRY H. CUMMINGS.

Witnesses:
JAMES R. HODDER,
R. G. HERSEY.